Oct. 6, 1931.  E. J. ABBE  1,826,489
INDUSTRIAL TRUCK
Filed March 14, 1927  3 Sheets-Sheet 1
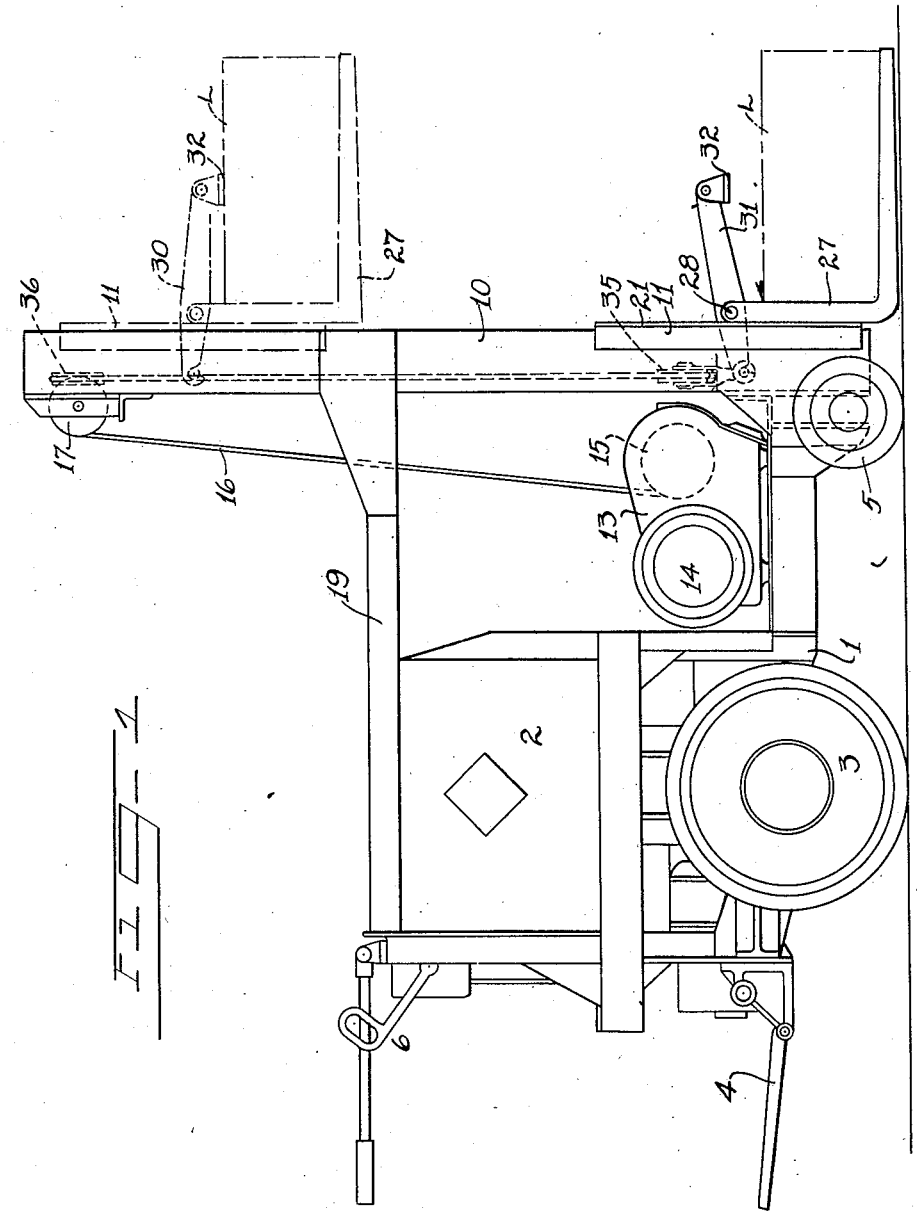
Inventor
Edward J. Abbe
By Bates, Macklin, Gobrick & Teare
Attorney Oct. 6, 1931.  E. J. ABBE  1,826,489
INDUSTRIAL TRUCK
Filed March 14, 1927   3 Sheets-Sheet 2
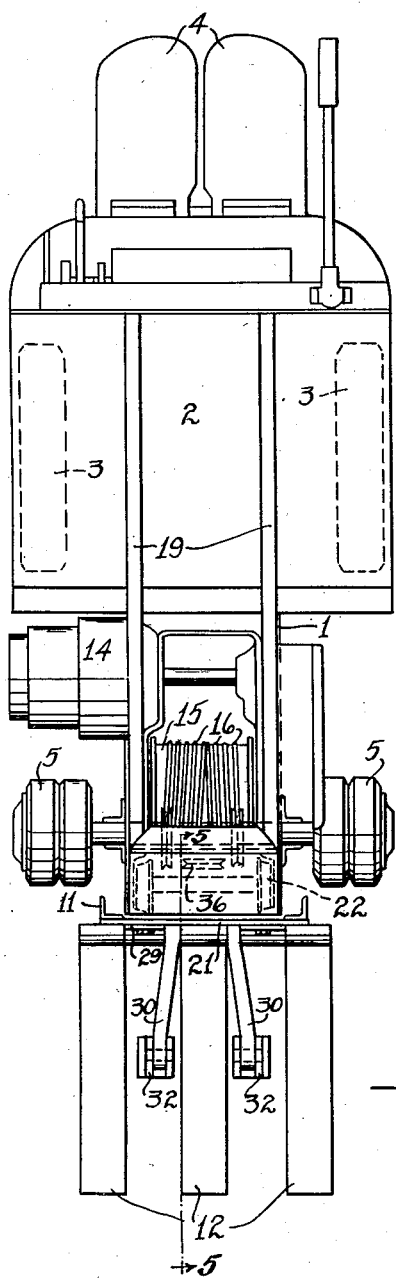
Inventor
Edward J. Abbe
By Bates, Macklin, Golrick & Teare
Attorneys

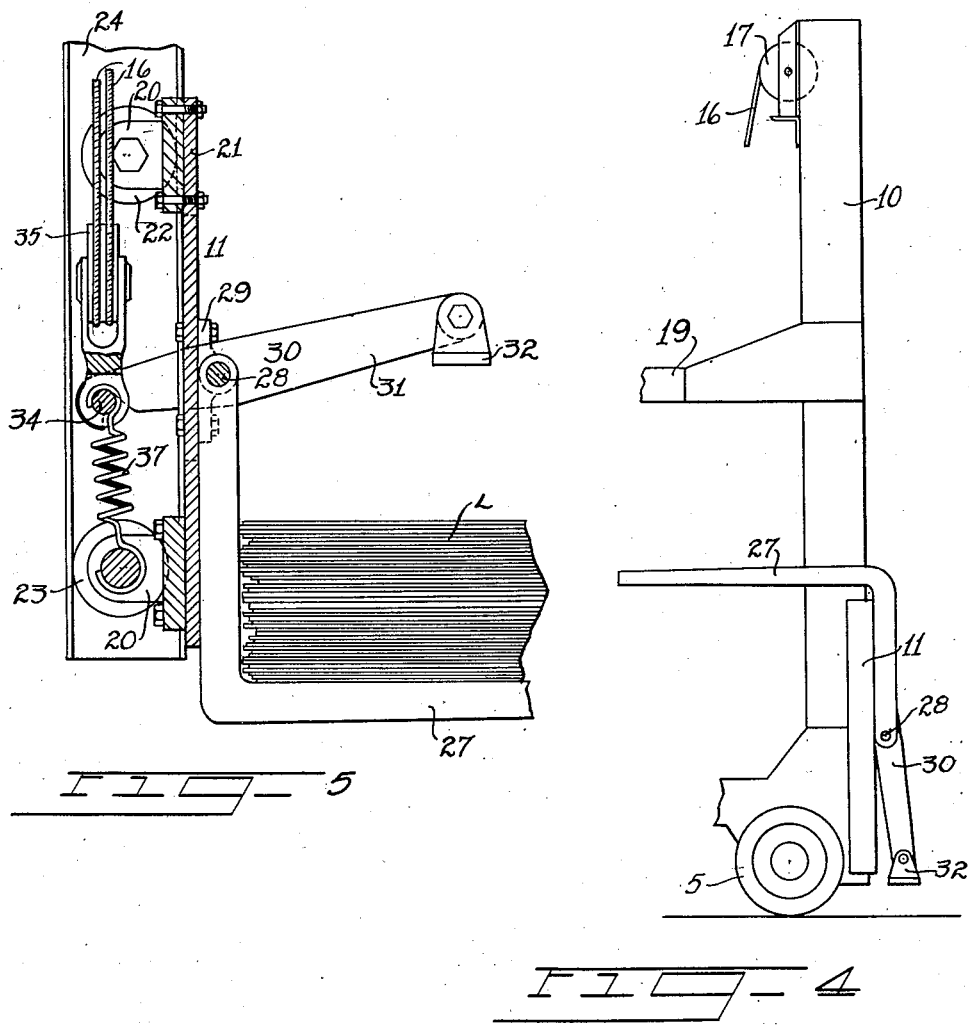

Patented Oct. 6, 1931

1,826,489

UNITED STATES PATENT OFFICE

EDWARD J. ABBE, OF CLEVELAND, OHIO, ASSIGNOR TO THE ELWELL-PARKER ELECTRIC COMPANY, OF CLEVELAND, OHIO, A CORPORATION OF OHIO

INDUSTRIAL TRUCK

Application filed March 14, 1927. Serial No. 175,394.

This invention relates to load handling mechanism, exemplified by the well known industrial truck. The invention particularly concerns load pick-up mechanism.

An object is to provide mechanism, in connection with a vehicle such as a truck, for engaging a load and gripping it to thereby hold the load firmly while moving it.

A specific object is to provide a simple mechanism for gripping and lifting a load by a single application of power. Still more specifically, an object is to provide a mechanism wherein the gripping and lifting is substantially simultaneous and in which the gripping force is proportional to the weight of the load.

As illustrated the invention is embodied in an industrial truck of the type shown and claimed in the prior patent to Clyde E. Cochran No. 1,399,543 issued December 6, 1921, which shows a four wheeled traction driven vehicle having a power unit including a battery housing and an operator's platform at the rear end and an upright boom or trackway at the other, a tier lift platform being mounted to vertically traverse the trackway.

The specific embodiment of the invention comprises as shown, a plurality of load engaging fork members intended to be slid under a load, for example a pile of metal sheets suitably supported on a ribbed platform or on stringers. A plurality of gripping pads, on arms, are positioned to grip downwardly on top of the sheets, the load elevating means (shown as a cable and suitable supporting sheaves) being arranged to act directly on the arms in such manner that as the cable starts to elevate the load it also acts to move the gripping pads toward the load, and thereafter, because the arms and forks are mounted on a common carriage, continued movement of the cable lifts the load.

In the drawings, Fig. 1 is a side elevation of the truck; Fig. 2 is a plan view thereof; Fig. 3 is an end elevation of the trackway and load engaging parts, Fig. 4 is a fragmentary side elevation similar to Fig. 1 but showing the load engaging parts folded for end clearance, and Fig. 5 is a longitudinal fragmentary cross-sectional view as indicated at 5—5 in Fig. 2.

The main truck frame is indicated at 1, the battery housing at 2, the rear traction wheels at 3, the operator's platform at 4, and the front wheels at 5. The various control levers, steering arm, hoist control levers, etc., are positioned on the battery housing and indicated collectively at 6.

The means for engaging and elevating the load is mounted forwardly of the truck, as shown, in which position the load engaging members may pick up the load from the ground on which the truck runs. An upright frame 10 serves as a trackway for a vertically movable carriage 11 on which suitable load lifting forks 12 are mounted. Suitable hoisting mechanism comprises a motor hoisting unit 13 consisting of a motor 14 adapted to receive power from the main batteries (not shown) located in the battery housing, which motor may be controlled from a switch within reach of the operator as he stands on the platform. This mechanism further comprises a hoisting drum 15 and a double cable 16 attached to the drum. The cable runs over sheaves 17 near the top of the trackway, thence downwardly to the carriage 11 to which it is indirectly attached as will be presently shown. Suitable bracing members may be provided as at 19 extending over the top of the battery housing to the boom, to lend rigidity to the boom.

The mounting for the carriage 11 comprises, as shown, brackets 20 suitably mounted on the carriage apron 21, the brackets carrying shafts for upper and lower sets of rollers 22 and 23 respectively which bear against flanges on upright channel members 24 comprised in the boom or trackway construction. The load lifting fork comprises L shaped members 27 pivotally attached as by a horizontal bar 28 supported in brackets 29 on the apron 21, the L shaped members bearing against the carriage along their leg portions and the foot portions being flattened out to extend beneath a load such as a stack of tin plate L positioned close to the ground and presumably supported on stringers. Supported on the bar 28 are a pair of arms 30 extending out over the fork as at 31 and having pivoted thereto pads such as 32 to engage and grip the load to prevent its being shaken off the fork while being raised or carried about by the truck. The rear ends of the arms are shown as hooked over a bar 34 suspended from the block of a sheave 35 which receives the double loop of the cable, the double loop being for compounding the lift of the hoist. The cable as shown, reaches downwardly from one sheave 17, passes about the sheave 35 then upwardly over an anchored sheave 36, again downwardly over the sheave 35 and upwardly to the other sheave 17.

By this arrangement it will be seen that, assuming the fork is under a load and the arms 30 held out of engagement therewith as by a tension spring 37, the initial pull on the cable as the hoist motor is started will not immediately raise the load. Such pull will first thrust the pads down on top of the load with a force depending on the weight of the load since the arms pivot theoretically about the pad as a fulcrum, raising the load and carriage through the pivot bar 28, the load being prevented from rotation by reason of resting against the lower end of the vertically held carriage.

A useful refinement resides in providing clearance whereby the fork members may be swung upwardly as shown in Fig. 4 the feet of the L members passing over the top of the carriage apron in which position the weight of the L members will hold them. Also clearance is provided by cutting out a portion of the apron as at 40 allowing the arms 30 to drop down to the position shown in Fig. 4. By this means the overall length of the truck may be materially decreased when empty, allowing easier manipulation of the truck in turning in and out of narrow aisles. Obviously, when the truck is thus, in effect, shortened, it is necessary to relieve the arms 30 from the restraining action of the spring 37. This may be done either by unhooking the spring from the bar 34 or unhooking the inner end of the arms from the bar, preferably the former.

I claim:

1. In combination with an industrial truck of the class described, upright guide means disposed at the front end of the truck, a member movably supported on the guide means, a depending L-shaped load engaging member supported thereby, the foot of the L being adapted to pass beneath the load to lift it, means for preventing rearward movement of the lower end of said L-shaped member, a clamp arm positioned over the load engaging portion of the L-shaped member, said arm and L-shaped member being coaxially pivoted to the first named member, the pivot axis being fixed with relation to said first named member, whereby the rear end of the arm may be raised to first clamp a load in place on the foot of the L, and thereafter to raise the load, and means for so raising the rear end of the arm.

2. In an industrial truck a main frame, traction wheels disposed at the rear of the frame, a pair of relatively small dirigible wheels disposed at the front of the frame, an upwardly extending trackway disposed forwardly of the front wheels, a carriage adjustable on said trackway, a downwardly and forwardly extending load engaging member, a portion of which is adapted to extend beneath a load to lift it, said member being pivotally supported by and bearing rearwardly against the carriage below the pivot, a clamp arm pivotally attached to the carriage coaxially with the load-engaging member and adapted to engage the top of the load to clamp it in place on the load engaging member, and hoisting mechanism arranged to first act on the clamp arm at the end thereof opposite the load engaging end and beyond the pivot to move it toward the load and thereafter by a continued movement to raise the carriage and load engaging member while maintaining the arm clamped against the load.

3. In an industrial truck, having an upright trackway mounted at one end thereof, load lifting and clamping mechanism, comprising a member adapted to extend beneath the load to lift it, a carriage mounted to traverse the trackway for sustaining the load engaging members, means pivotally mounted on said carriage and adapted to clamp a load on said load lifting member, a cable engaging the clamping means for effecting the clamping operation thereof and arranged to thereafter raise the carriage and the load, there being a spring for holding the clamping means in normally raised position, said spring acting substantially in line with the cable.

In testimony whereof, I hereunto affix my signature.

EDWARD J. ABBE.